United States Patent
Earnshaw et al.

(10) Patent No.: US 7,463,616 B1
(45) Date of Patent: Dec. 9, 2008

(54) SCHEDULING BASED ON CHANNEL CHANGE INDICIA

(75) Inventors: Mark Earnshaw, Nepean (CA); Bassam M. Hashem, Nepean (CA); Yoon Chae Cheong, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 1293 days.

(21) Appl. No.: 10/108,624

(22) Filed: Mar. 28, 2002

(51) Int. Cl.
  *H04B 7/212* (2006.01)
(52) U.S. Cl. .............. 370/347; 370/337; 370/339; 370/341; 370/442; 455/69; 455/522; 455/452
(58) Field of Classification Search ........... 370/337, 370/339, 329, 341, 347, 431, 442; 455/522, 455/69, 450, 67.11, 452.1, 452
See application file for complete search history.

(56) References Cited

U.S. PATENT DOCUMENTS

| | | | |
|---|---|---|---|
| 5,121,391 A * | 6/1992 | Paneth et al. ............... 370/341 |
| 5,124,985 A * | 6/1992 | Hoshikawa ................. 370/347 |
| 5,428,637 A * | 6/1995 | Oliva et al. ................. 375/134 |
| 5,506,848 A * | 4/1996 | Drakopoulos et al. ....... 370/336 |
| 5,914,950 A * | 6/1999 | Tiedemann et al. ......... 370/348 |
| 5,923,650 A * | 7/1999 | Chen et al. .................. 370/331 |
| 6,230,026 B1 * | 5/2001 | Schwaller et al. ........... 455/561 |
| 6,295,285 B1 * | 9/2001 | Whitehead .................. 370/329 |
| 6,335,922 B1 * | 1/2002 | Tiedemann et al. ......... 370/335 |
| 6,424,833 B1 * | 7/2002 | Iizuka et al. ................ 455/436 |
| 6,560,628 B1 * | 5/2003 | Murata ...................... 718/103 |
| 6,567,397 B1 * | 5/2003 | Campana, Jr. et al. ....... 370/349 |
| 6,611,755 B1 * | 8/2003 | Coffee et al. ............... 701/213 |
| 6,694,147 B1 * | 2/2004 | Viswanath et al. .......... 455/517 |
| 6,788,687 B2 * | 9/2004 | Bao et al. ................... 370/394 |
| 6,807,426 B2 * | 10/2004 | Pankaj ....................... 455/453 |
| 6,850,499 B2 * | 2/2005 | Wheatley et al. ........... 370/328 |
| 6,917,812 B2 * | 7/2005 | Damnjanovic ............ 455/452.2 |
| 6,950,669 B2 * | 9/2005 | Simonsson .................. 455/522 |
| 6,985,453 B2 * | 1/2006 | Lundby et al. .............. 370/311 |
| 7,158,794 B2 * | 1/2007 | Choi ........................ 455/452.2 |
| 2001/0040877 A1 * | 11/2001 | Love et al. .................. 370/329 |
| 2003/0002518 A1 * | 1/2003 | Shibutani .................... 370/442 |
| 2004/0252659 A1 * | 12/2004 | Yun et al. .................... 370/328 |
| 2004/0258024 A1 * | 12/2004 | Tiedemann et al. ......... 370/332 |
| 2005/0002352 A1 * | 1/2005 | Bao et al. .................... 370/328 |
| 2005/0197150 A1 * | 9/2005 | Sarkar et al. ................ 455/522 |

* cited by examiner

*Primary Examiner*—Edan Orgad
*Assistant Examiner*—Andrew C Lee
(74) *Attorney, Agent, or Firm*—Withrow & Terranova, P.L.L.C.

(57) ABSTRACT

The present invention keeps track of channel change indicia associated with wireless communications with mobile terminals, and bases the scheduling of data in time slots of a scheduling period on the channel change indicia. The channel change indicia may be derived from any information that bears on the rate at which channel conditions are likely to change, such as the velocity the mobile terminals are traveling or actual channel condition measurements. Preferably, mobile terminals associated with intermediate values for the channel change indicia are given priority, and thus, scheduled for transmission before those with lower and higher values. The invention is applicable to uplink and downlink communications, and is particularly beneficial when implemented in uplink and downlink schedulers in a base station.

28 Claims, 5 Drawing Sheets

SCHEDULING BASED ON CHANNEL CHANGE INDICIA

FIELD OF THE INVENTION

The present invention relates to wireless communications, and in particular to scheduling communication resources based on channel change indicia.

BACKGROUND OF THE INVENTION

Many wireless communication systems assign transmission resources using a centralized scheduler. Typically, these resources have a time division multiple access (TDMA) component, wherein communications between a base station and a select mobile terminal are assigned to a given time slot. For downlink communications wherein a base station transmits data to a mobile terminal, the base station's downlink scheduler receives data intended to be transmitted to the mobile terminal, and allocates a certain time slot in which to transmit data to the mobile terminal. Notably, transmissions to different mobile terminals are assigned to different time slots to facilitate an ordered transmission of data amongst the mobile terminals being served by the base station. Similarly, in uplink communications wherein the mobile terminal is transmitting data to the base station for delivery across the network, the base station's uplink scheduler determines when the mobile terminal can transmit information to the base station, and via control signaling, instructs the mobile terminal of the time slots in which it can transmit data to the base station.

In many applications, the TDMA component of communications works in conjunction with other multiple access technologies, such as code division multiple access (CDMA), and the 3G high-speed wireless data systems, such as 1xEV and HSDPA. Those skilled in the art will recognize existing hybrid systems having a TDMA component, and will appreciate the applicability of the present invention to future technologies incorporating a TDMA component in a multiple access communication scheme.

In an effort to reduce interference caused by other mobile terminals, it is often desirable to control the transmission power of mobile terminals for uplink communications. In essence, the various mobile terminals should only transmit at power sufficient to achieve communications having a defined minimum of errors. Accordingly, various types of power control signaling are used to monitor error rates associated with communications for a mobile terminal and to control the mobile terminal's transmission power to achieve a desired error rate. Unfortunately, the movement of mobile terminals impacts uplink and downlink transmission channel conditions, and requires the base station and mobile terminal to cooperate in a manner to ensure that transmissions are properly received. As such, most systems have a built-in safety margin by using higher transmission powers for uplink communications. Unfortunately, this means that at any given time, these mobile terminals are transmitting at transmission powers much higher than necessary to achieve the desired error rates.

In similar fashion, the base stations often have to allocate excessive resources to ensure transmissions are properly received by mobile terminals during downlink communications. Although many base stations do not use power control schemes for transmission, they do often change modulation and coding techniques to make transmission more or less robust, as well as to transmit at higher or lower data rates. For example, the base station may attempt to modulate and encode data to maximize data rates, but must err on the conservative side to ensure that communications are properly maintained and error rates are less than a defined maximum value if channel conditions change. Again, significant safety margins erring on more robust modulation, more coding, and lower data rates unnecessarily impact the efficiency of the wireless communication system.

Accordingly, there is a need for a technique to enhance the efficiency of communications in wireless communication networks while minimizing interference in communications with other mobile terminals. There is a further need to more efficiently allocate resources in light of actual channel conditions to avoid the unnecessary safety margins built into existing systems.

SUMMARY OF THE INVENTION

The present invention keeps track of channel change indicia for wireless communications with mobile terminals, and bases the scheduling of data in time slots of a scheduling period on the channel change indicia. The channel change indicia may be derived from any information that bears on the rate at which channel conditions are likely to change, such as the velocity the mobile terminals are traveling or actual channel condition measurements. Preferably, mobile terminals associated with intermediate values for the channel change indicia are given priority, and thus, scheduled for transmission before those with lower and higher values. The invention is applicable to uplink and downlink communications, and is particularly beneficial when implemented in uplink and downlink schedulers in a base station.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
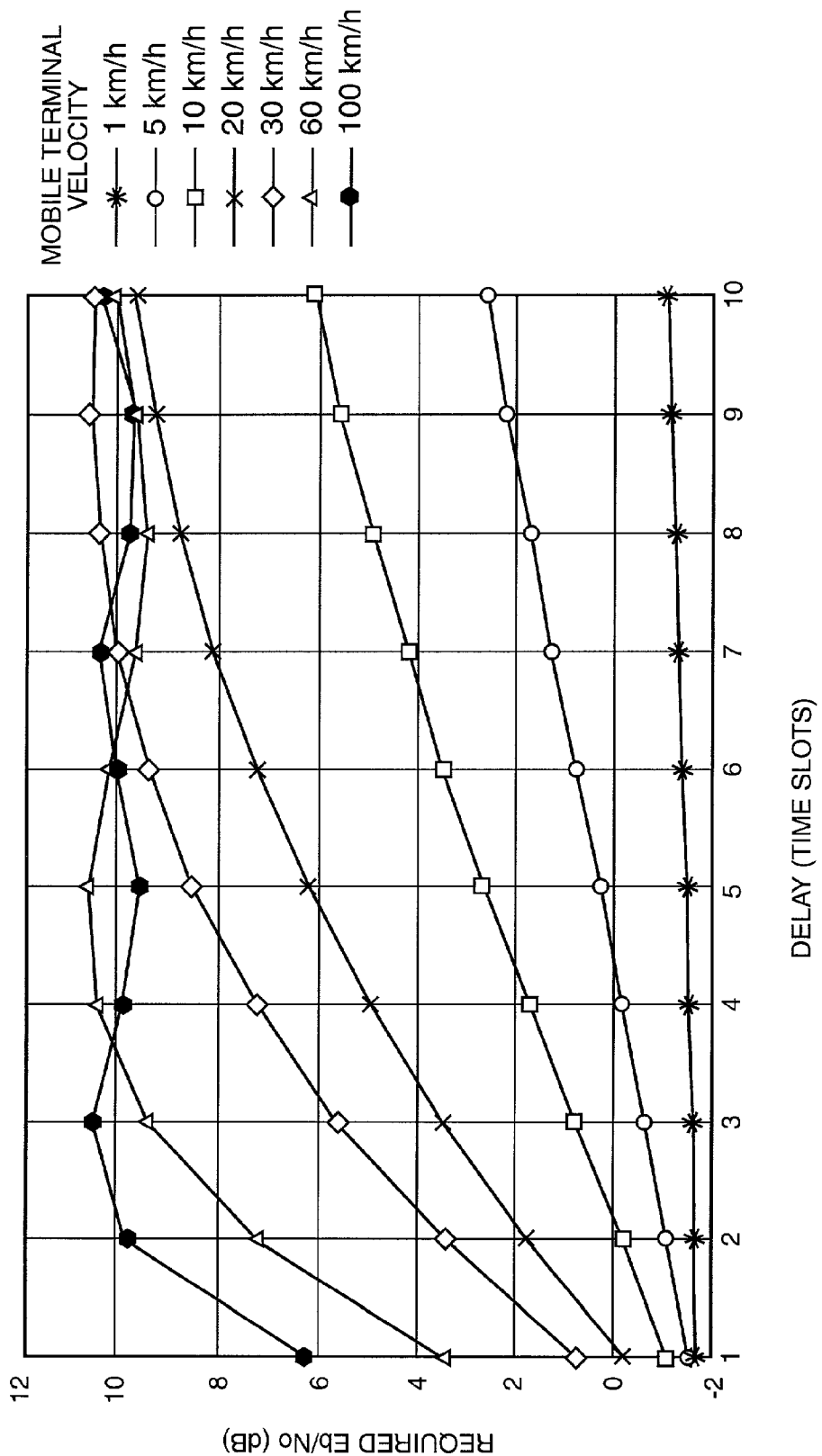
FIG. 1 is a graph illustrating the effect of reporting delays for channel conditions in light of mobile terminal velocity.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention assigns wireless communication resources for different mobile terminals in a wireless communication environment based on indicia bearing on the rate of change of channel conditions. The technique is applicable to uplink and downlink communications, and is particularly beneficial when implemented in uplink or downlink schedulers in a base station. For wireless systems including a TDMA component, communications to or from the mobile terminal are scheduled for a defined time slot within a given scheduling period. Accordingly, the data sent to or from a mobile terminal is essentially assigned to a scheduling period and then scheduled for time slots within the scheduling period.

Downlink and uplink scheduling is often based on error rates derived from past communications and the priority of data being transmitted. Once the data is scheduled, the communication resources allocated for transmission have been historically based on past error rates. The communication resources, whether coding or modulation techniques for downlink communications or transmission power for uplink communications, have built-in safety margins in case channel conditions change to a degree that would significantly impact the desired error rates. These safety margins waste resources and increase interference.

In an effort to allocate resources more accurately, the present invention monitors indicia indicative of the rate at which channel conditions are changing and assigns slots within a scheduling period based thereon. Preferably, channel change indicia bearing on the rate at which channel conditions are changing are broken into three categories: low, intermediate, and high. Generally, the channel change indicia are directly related to the velocity of the mobile terminal. The higher the velocity, the faster channel conditions are likely to change. Accordingly, the channel change indicia may be derived from a variety of sources in a variety of ways. For example, the velocity of the mobile terminal may be derived from positioning techniques, such as GPS measurements or triangulation calculations for a mobile terminal over time, as well as more direct methods of measuring changes in transmitted signals caused by changing channel conditions. In the latter case, channel change indicia may be derived from channel estimation circuitry in the receiver circuitry of the base station or the mobile terminal. Those skilled in the art will recognize the various ways to actually measure or to estimate the rate at which channel conditions are likely to change or are actually changing. For consistency and clarity, the channel change indicia bear on the rates at which channel conditions actually or will likely change.

To optimize the allocation of communication resources, the allocations would directly correspond to the channel conditions at the time in which communications take place. In existing systems, there is always a delay between determining the corresponding error rates associated with communications and scheduling data for transmission for either uplink or downlink communications. Thus, the error rates for prior communications may or may not provide the scheduler with sufficient information to select the appropriate resources for transmission. This delay is a primary reason for the safety margin used for allocating resources. For certain communications, the delay is further compounded based on the slot assignment within the scheduled scheduling period. For example, the last slot in the scheduling period may pose a significant delay from the first slot in the scheduling period. If the channel conditions are changing very slowly, such as when the mobile terminal is moving slowly, increasing the delay between error or channel measurements and the actual data transmission time has negligible effect on resource allocation. Similarly, if the channel conditions for a mobile terminal are changing very quickly, such as when the mobile terminal is moving quickly, the accuracy of the reported error or channel measurements so quickly degrades with time that introducing an additional delay within the scheduling period would not have a significant impact on resource allocation. However, when a mobile terminal's channel conditions are changing at an intermediate rate, such as when the mobile terminal is moving at an intermediate velocity, the additional delay between reporting error or channel condition measurements and the actual data transmission time can significantly affect the resources necessary for transmission.

With reference to FIG. 1, a typical CDMA-TDMA hybrid uplink configuration is used to illustrate the effects of delays in reporting channel conditions. Each curve represents a different mobile terminal velocity. For each velocity, the time delay, which is measured in slots in a scheduling period between the time channel conditions are reported and the time that data is transmitted, was varied from one to ten time slots. Each mobile terminal was subjected to a time-correlated Rayleigh fading, with a Doppler value calculated from the associated velocity of the mobile terminal. The carrier frequency for communications was approximately 2 gigahertz. A fixed block error rate (BLER) curve was used to determine whether each transmitted data block, corresponding to one time slot, was an error, based on the current channel conditions and assigned transmission power. Based on the observed errors, power control was used to adjust a desired Eb/No (energy per bit/noise density) for each mobile terminal to an appropriate value in order to obtain a desired BLER of one percent. In general, the greater the difference between the channel conditions at the time of reporting and at the time of transmission, the greater the required Eb/No. The higher the Eb/No, the larger the safety margin or transmission power.

As seen from the graph, when a mobile terminal moves very slowly, such as at 1 kilometer per hour, the corresponding communication channel changes very slowly. Hence, there is a negligible amount of error introduced in the channel conditions as a function of the reporting delay, and thus, the required Eb/No value is almost constant throughout the various reporting delays. In this situation, the reporting delay should have little to no impact on transmission power required to achieve a desired error rate. Conversely, for fast moving mobile terminals, such as those traveling between 60 and 100 kilometers per hour, the channel conditions change very quickly. In these cases, the required Eb/No value quickly reaches a plateau after a reporting delay of only a few slots within the scheduling period. Again, there is a minimal relationship between the amount of transmission power required and the reporting delay, since the fast moving mobile terminal will likely be operating in the plateau region before error rate or channel conditions are reported to the scheduler. In general, the reporting delay is at least two to three time slots.

For mobile terminals traveling between 5 and 30 kilometers per hour, the required Eb/No values increase in an essentially linear fashion as the function of the reporting delay over the scheduling period. In this situation, a lower transmission power could be used if the mobile terminals were assigned slots earlier in the scheduling period. Communication for the lower and higher velocity mobile terminals could be scheduled later in the scheduling period, since the additional delay for these mobile terminals has little or no impact on the required transmission power.

Thus, the present invention schedules transmissions within a scheduling period based on channel change indicia. In one embodiment, mobile terminals having intermediate values for the channel change indicia are given priority in the scheduling period over those with lower and higher values. The following provides a detailed overview of communications between a mobile terminal and a base station and the operation of uplink and downlink schedulers in a base station.

Figure 2:
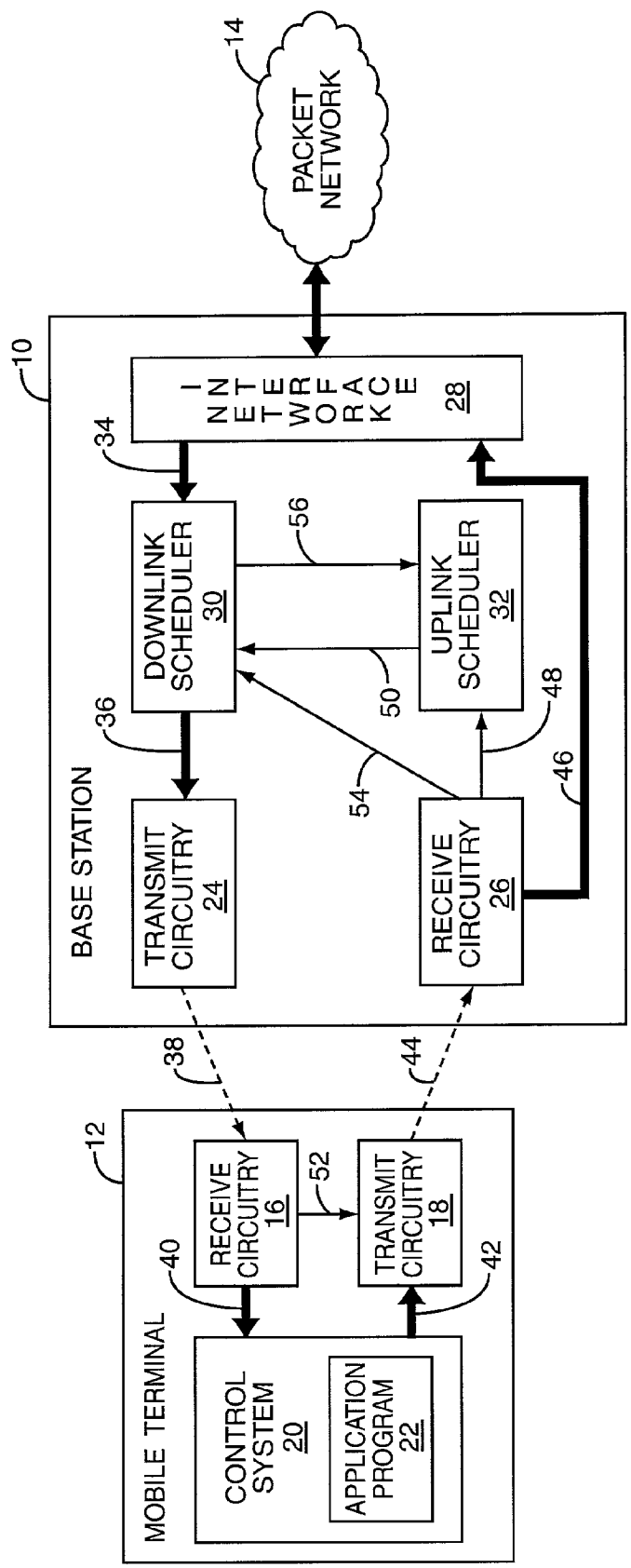
FIG. 2 is a block representation of a communication environment according to one embodiment of the present invention.

With reference to FIG. 2, an exemplary wireless communication environment is illustrated, wherein a base station 10 facilitates communications between a mobile terminal 12 and any number of devices on a packet network 14. In general, the mobile terminal 12 includes receive circuitry 16 and transmit circuitry 18 for facilitating downlink and uplink communications, respectively, with the base station 10. The mobile terminal 12 will also include a control system 20 having resident application programs 22, which are capable of processing incoming information and providing outgoing information for transmission to the base station 10 via the transmit circuitry 18.

The base station 10 will include transmit circuitry 24 and receive circuitry 26 configured to facilitate downlink and uplink communications, respectively, with the mobile terminal 12. The transmit and receive circuitry 24, 26 cooperate with a network interface 28, a downlink scheduler 30, and an uplink scheduler 32 to facilitate communications between the mobile terminal 12 and the packet network 14. In general, the thick, solid lines indicate dataflow; the thin, solid lines indicate control and signaling information; and the dashed lines indicate wireless communications, which may include data control and signaling information.

For downlink communications, data received directly or indirectly from the packet network 14 at the network interface 28 is delivered to the downlink scheduler 30 (line 34) for scheduling. Notably, data is continuously received for a variety of mobile terminals 12 that are served by the base station 10, and the downlink scheduler 30 will schedule the data to be transmitted to the mobile terminal 12 during a given time slot within a scheduling period. Details on how the slot within the scheduling period is determined for a given mobile terminal 12 are described later in this specification. Once the data for the various mobile terminals 12 are scheduled in their given slots within the scheduling period, the data is systematically provided to the transmit circuitry 24 (line 36) for transmission to the various mobile terminals 12 during a time period corresponding to the assigned time slot (line 38).

As those skilled in the art will appreciate, the transmitted data is encoded or otherwise modulated such that the mobile terminal 12 will only receive and recover information intended to be transmitted and ignore information intended for other mobile terminals 12. Accordingly, the receive circuitry 16 of the mobile terminal 12 will receive, downconvert, and demodulate the transmitted signals to uncover the transmitted data, which is then sent to the proper application program 22 of the control system 20 (line 40).

For uplink communications, the application program 22 will generate data for delivery over the packet network 14. The control system 20 will deliver the data to be transmitted to the mobile terminal's transmit circuitry 18 (line 42), which will modulate and transmit the data to the base station 10 (line 44). The receive circuitry 26 of the base station 10 will downconvert, demodulate, and recover the transmitted data, which will be delivered to the network interface 28 (line 46) for delivery to the packet network 14.

Notably, the uplink and downlink communications (lines 44 and 38) also include control signaling and other information to facilitate reliable communications between the mobile terminal 12 and the base station 10. A significant amount of control signaling between the mobile terminal 12 and the base station 10 relates to scheduling uplink transmissions from the mobile terminal 12 to the base station 10. For example, the mobile terminal 12 typically transmits only during certain time slots in an uplink scheduling period, wherein the base station 10, via downlink communications (line 38), tells the mobile terminal 12 which slot to use for uplink communications (line 44). Accordingly, the mobile terminal 12 will send transmission requests to the base station 10. The transmission requests are received and processed in the receive circuitry 24 and sent to the uplink scheduler 32 (line 48). The receive circuitry 26 may also monitor channel conditions in traditional fashion for uplink communications (line 44) and provide such information to the uplink scheduler 32 (line 48).

The uplink scheduler 32 will process the transmission requests from the mobile terminal 12 and provide transmission grants for the mobile terminal 12. The transmission grants authorize the mobile terminal 12 to provide uplink communications at defined time slots within defined uplink scheduling periods. The transmission grants must be sent to the mobile terminal 12 via downlink communications (line 38), and thus are sent to the downlink scheduler 30 (line 50), which will schedule delivery of the transmission requests along with the data being transmitted to the various mobile terminals 12 as described above. The mobile terminal 12 will receive the transmission grant and transmit the data subject to the transmission request during the time slot or slots authorized by the base station 10.

For downlink communications, the receive circuitry 16 of the mobile terminal 12 is capable of monitoring channel conditions for the downlink communications (line 38) and passes channel condition information to the transmit circuitry 18 (line 52), which will transmit the channel conditions to the base station 10. The base station's receive circuitry 26 will recover the downlink channel condition information, which is then forwarded to the downlink scheduler 30 (line 54). Notably, the downlink scheduler 30 must request uplink resources from the uplink scheduler 32 (line 56) to allow the mobile terminal 12 to transmit the downlink channel condition information, which was measured by the mobile terminal 12, to the base station 10. Accordingly, the downlink and uplink schedulers 30, 32 cooperate with one another to schedule downlink and uplink communications, as well as to allow the mobile terminal 12 to monitor channel conditions associated with downlink communications and feed the channel condition information back to the base station 10 via uplink communications.

Accordingly, the downlink scheduler 30 will have channel condition information pertaining to downlink communications, and the uplink scheduler 32 will have channel condition information pertaining to uplink communications. The former is monitored by the mobile terminal 12 and fed back to the base station 10, and the latter is monitored in the receive circuitry 26 of the base station 10.

For downlink communications, the base station's transmit circuitry 24 typically transmits at a consistent power level for all mobile terminals 12 over all scheduling periods and time slots therein. Given varying channel conditions and other variables affecting wireless communications, the base station 10 and mobile terminal 12 cooperate to achieve communications with a desired error rate. If error rates are too high, quality of service levels drop to undesirable levels and the amount of traffic increases due to the retransmission of lost information. If error rates are too low for any given mobile terminal 12, communication resources are wasted and data rates could be increased to optimize efficiency of the system.

Since the base station 10 typically maintains a constant transmit power during downlink communications, the communication resources for downlink communications may pertain to the link mode used to facilitate downlink transmissions.

The link mode relates to the type of coding, modulation, and data rates used to facilitate downlink communications. In general, the more robust the encoding and modulation, the lower the data rates, wherein the goal would be to achieve the desired error rate while maximizing data rate and using lower encoding and higher modulation rates. For uplink communications, transmit power levels of the mobile terminals 12 are constantly varied in an effort to maintain the desired error rates for uplink communications. Keeping the mobile terminal's transmit power at minimum required levels to achieve a desired error rate minimizes the interference injected on communications associated with other mobile terminals 12, as well as extending the battery life of the mobile terminal 12. Thus, the primary communication resource for uplink communications is the transmit power required to achieve the minimum error rate for uplink communications. As noted above, safety margins are built in during allocation of communication resources to avoid dropping communications when channel conditions degrade to a level wherein the assigned communication resources are insufficient to facilitate communications.

The present invention keeps track of channel change indicia associated with uplink or downlink communications with a certain mobile terminal 12, and bases the scheduling of data in a slot for a scheduling period on the channel change indicia. The channel change indicia may be any indication bearing on the likelihood of channel conditions changing at a certain rate. As illustrated in FIG. 1, the reporting delay, or time necessary to gather information bearing on channel conditions, impacts the ability to predict channel conditions for data to be scheduled. For mobile terminals 12 traveling at very low or high velocities, scheduling delay has little or no impact on the predictability of channel conditions for data to be transmitted. Channel conditions for slow moving mobile terminals 12 are not likely to change, and thus previous channel conditions are very likely to be the same as future channel conditions. For fast moving mobile terminals 12, the channel conditions will likely change faster than the reporting delay; thus, reported channel conditions have little impact on the predictability of future channel conditions. Importantly, channel conditions for mobile terminals traveling at intermediate velocities may change significantly over a given scheduling period.

The present invention biases scheduling of time slots for mobile terminals 12 associated with channel conditions changing at an intermediate rate at the beginning of a scheduling period to minimize the delay between the transmission of data and the determination of channel change indicia, which may be based on actual channel conditions or the velocity of the mobile terminal 12. By timing transmissions closer to the determination of channel change indicia, less of a safety margin is necessary in allocated communication resources, whether transmission power or coding and modulation techniques, to achieve a desired error rate. Accordingly, the invention allows for more optimized communications, which cause less interference among uplink communications and provide higher data rates for all communications.

Figure 3:
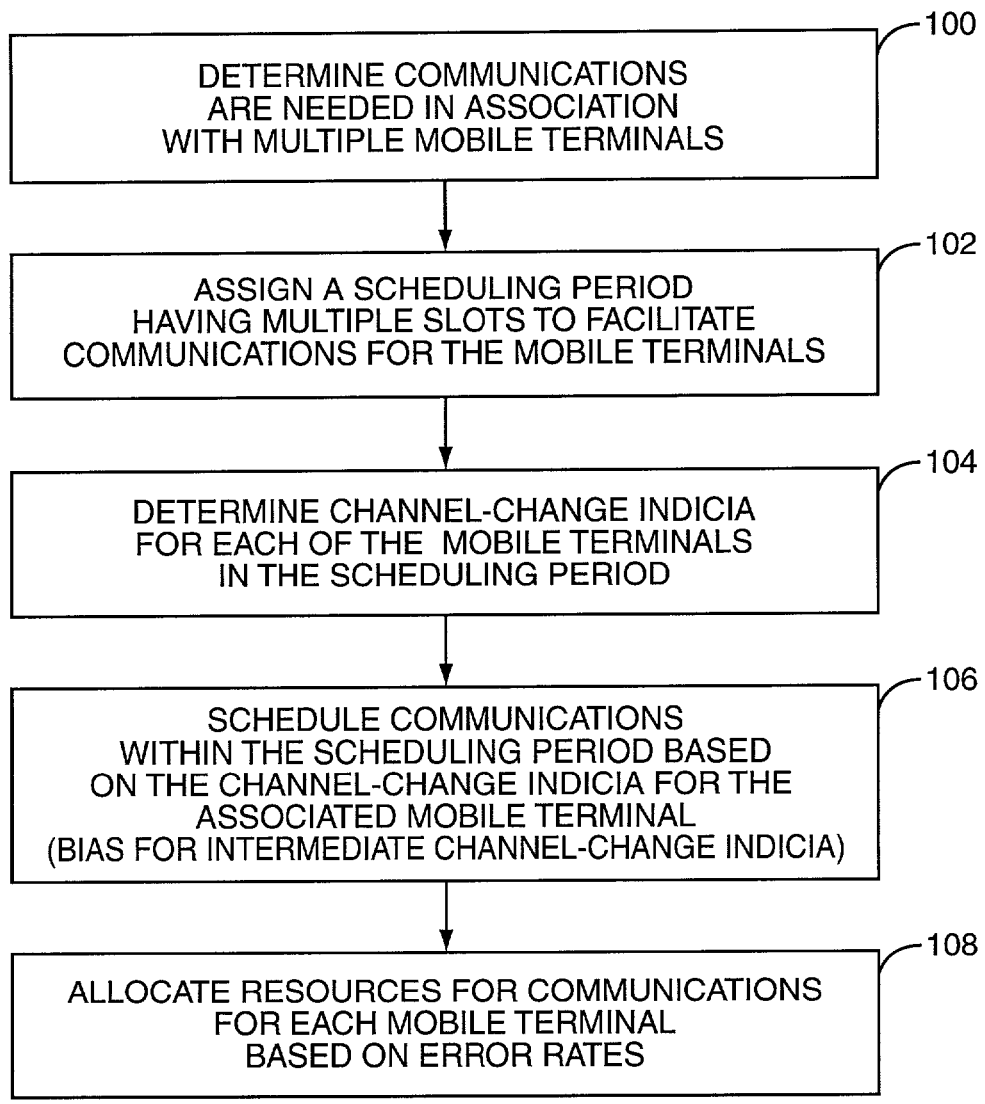
FIG. 3 is a flow diagram outlining a process for allocating resources according to one embodiment of the present invention.

With reference to FIG. 3, an overall scheduling flow for uplink or downlink communications is provided from the base station's perspective. Upon receiving data over a network or a request for transmission from a mobile terminal 12, the base station 10 will determine that communications are needed in association with multiple mobile terminals 12 (step 100). The base station 10 will assign a scheduling period, which has multiple time slots, to facilitate communications with the mobile terminals 12 (step 102). The base station 10 will determine channel change indicia for each of the mobile terminals 12 in the scheduling period (step 104) and schedule communications within the scheduling period based on the channel change indicia (step 106). Preferably, communications for mobile terminals 12 that have intermediate values for the channel change indicia are biased toward the beginning of the scheduling period, wherein higher intermediate values are prioritized over lower intermediate values. Those with lower or higher values for the channel change indicia are scheduled in time slots toward the end of the scheduling period. The base station 10 will then allocate resources for communications for the various mobile terminals 12 based on a desired error rate for communications (step 108). Preferably, the allocated resources for downlink communications are coding and modulation rates, wherein the allocated resource for uplink communications is transmission power. A more detailed overview of scheduling for downlink and uplink communications is provided in flow diagrams associated with FIGS. 4 and 5, respectively.

Figure 4:
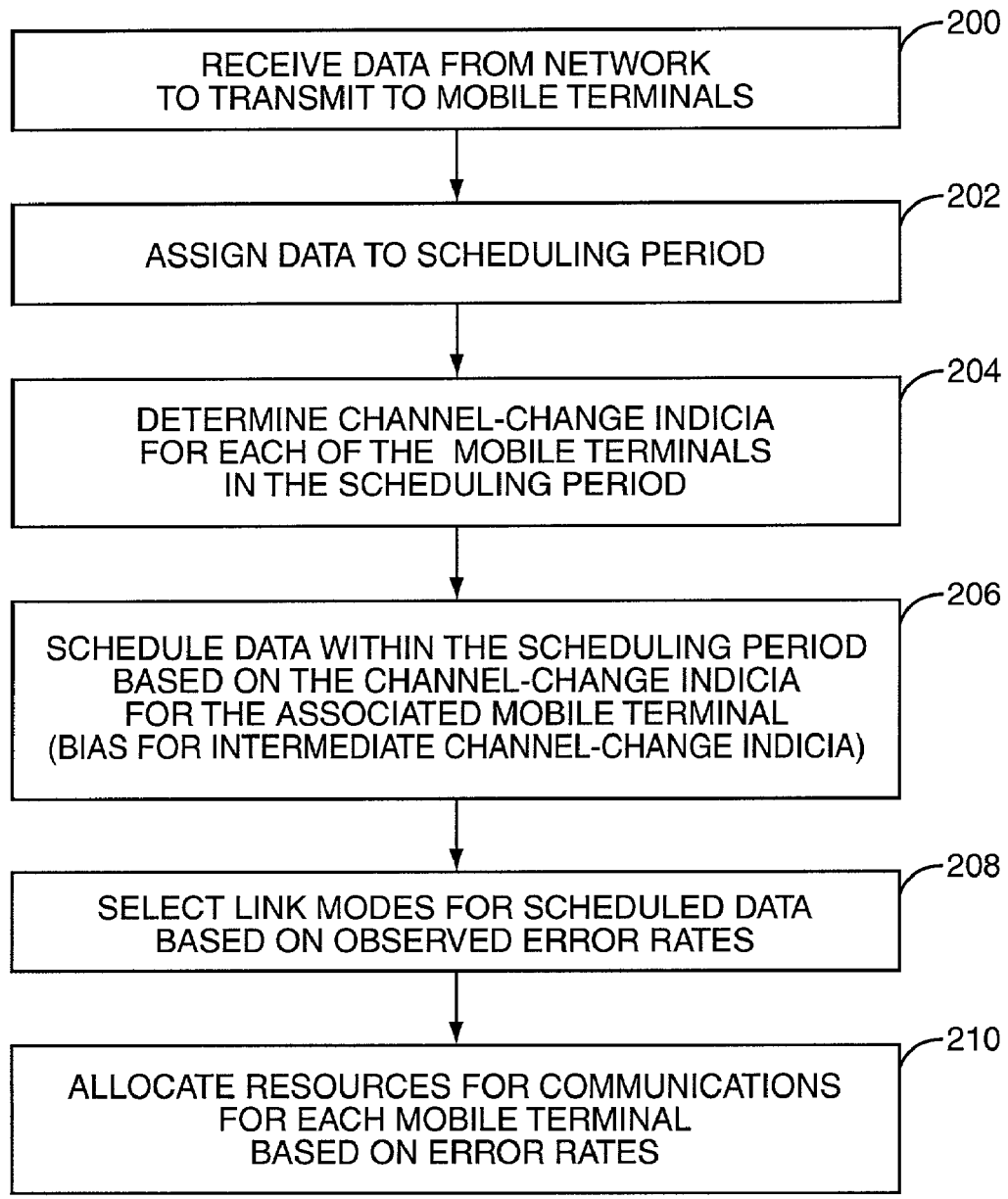
FIG. 4 is a flow diagram outlining an exemplary downlink communication process according to one embodiment of the present invention.
Figure 5:
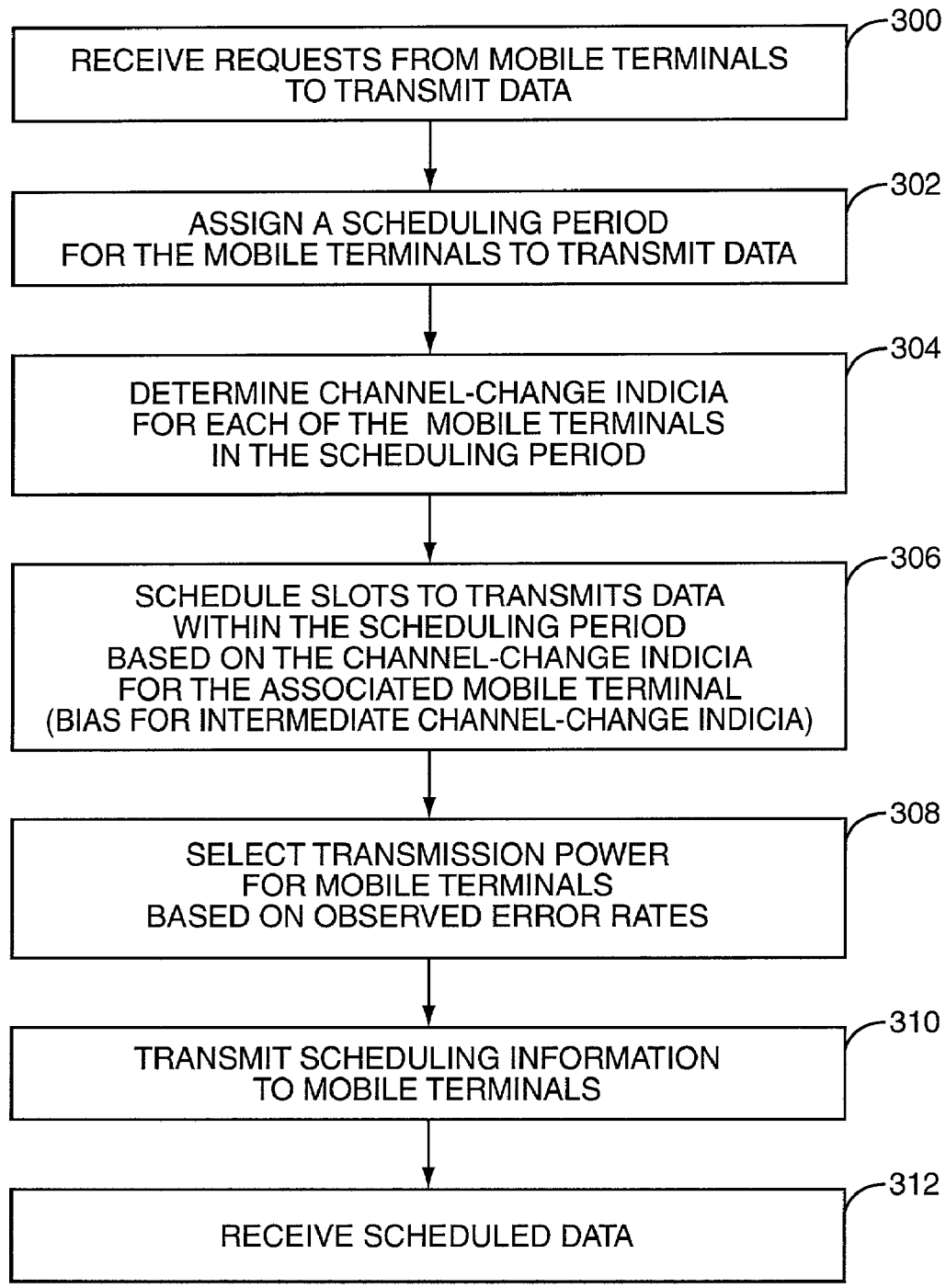
FIG. 5 is a flow diagram outlining an exemplary uplink communication process according to one embodiment of the present invention.

With reference to FIG. 4, downlink communications are initiated when a base station 10 receives data from the packet network 14 to transmit to the mobile terminals 12 (step 200). The downlink scheduler 30 will assign data to a scheduling period (step 202) and determine channel change indicia for each of the mobile terminals 12 in the scheduling period (step 204). The channel change indicia may be derived from channel conditions monitored by the mobile terminal 12 and fed back to the downlink scheduler 30 via uplink communications from the mobile terminal 12 to the base station's receive circuitry 26, as described above. From previous channel condition measurements, the rate of change in channel conditions can be derived to form the channel change indicia. Alternatively, position information from positioning electronics on the mobile terminal 12 can be transmitted to the base station 10. In yet another alternative, the wireless communication infrastructure may allow multiple base stations 10 to cooperate with one another to facilitate triangulation for a given mobile terminal 12 to determine its position and provide position information to the servicing base station 10. Consecutive positioning measurements can be used to determine a velocity, which correlates to the rate at which channel conditions are likely to change. Those skilled in the art will recognize other factors, variables, and information that can be used alone or in combination to generate channel change indicia, which bear on the rate of change of channel conditions for a given mobile terminal 12.

Based on the channel change indicia, data for the various mobile terminals 12 are scheduled in time slots within the scheduling period (step 206). Again, those mobile terminals 12 associated with intermediate channel change indicia values are biased toward the beginning of the scheduling period; thus, the data for these mobile terminals 12 are scheduled in the initial slots of the scheduling period (step 206). The downlink scheduler 30 and transmit circuitry 24 will cooperate to select a given link mode based on observed error rates (step 208) and transmit the scheduled data using the selected link modes at scheduled times to each of the mobile terminals 12 (step 210). Again, the link modes relate to the coding and modulation techniques that facilitate various rates of data transfer to achieve a desired error rate. If the error rates increase, the coding and modulation techniques are made more robust, which typically results in lower data rates and lower error rates. In the converse, if the observed error rates are lower than the desired error rates, the coding and modulation techniques are adjusted to be less robust and provide higher data rates and higher error rates.

By adjusting the scheduling of data for mobile terminals 12 associated with intermediate channel change indicia, the data is transmitted at times closer to those when the channel change indicia is determined. Thus, the selected link modes are more likely to address the actual channel conditions of the downlink communications.

For uplink communications, the base station 10 will receive requests from mobile terminals 12 to transmit data (step 300). The downlink scheduler 30 will assign a scheduling period for the mobile terminals 12 to transmit data (step 302), as well as determine channel change indicia for each of the mobile terminals 12 in the scheduling period (step 304). Based on the channel change indicia for the various mobile terminals 12, the base station 10 will schedule slots to transmit data within the scheduling period (step 306). Again, mobile terminals 12 associated with an intermediate channel change indicia are biased toward the beginning of the scheduling period. The base station 10 will select the transmission power for the mobile terminals 12 to use during transmission based on error rates associated with prior communications (step 308). The selection of transmission power may be the selection of an actual power level, or simply instructions to increase or decrease the power level used for the most recent transmissions.

The transmit circuitry 24 will transmit the scheduling information provided by the downlink scheduler 30 to the mobile terminals 12 (step 310). The scheduling information will include the transmission grant and information for controlling transmission power. The mobile terminal 12 will receive the scheduling information and transmit the data to the base station 10, which will receive the scheduled data and forward it to the packet network 14 (step 312).

Those skilled in the art will recognize improvements and modifications to the preferred embodiments of the present invention. All such improvements and modifications are considered within the scope of the concepts disclosed herein and the claims that follow.

What is claimed is:

1. A method for scheduling communications in a wireless communication environment for a plurality of terminals comprising:
   a) scheduling communications for a plurality of terminals to a scheduling period having a plurality of time slots;
   b) determining channel change indicia associated with each of the plurality of terminals having communications scheduled during the scheduling period; and
   c) scheduling the communications to an assigned time slot within the scheduling period based on the channel change indicia,
wherein the communications for any one of the plurality of terminals occurs during the assigned time slot within the scheduling period, and
   wherein the channel change indicia can have low, intermediate, and high values and the communications associated with intermediate channel change indicia values are scheduled for time slots at a beginning of the scheduling period and ahead of communications associated with the low and high channel change indicia values, the values for channel change indicia proportional to a rate at which channel conditions are likely to change.

2. The method of claim 1 wherein the channel change indicia bears on a rate at which channel conditions are likely to change.

3. The method of claim 1 wherein the channel change indicia for at least one of the plurality of terminals bears on a rate at which actual channel conditions are changing and is derived from periodic measurements of the channel conditions.

4. The method of claim 1 wherein the channel change indicia for at least one of the plurality of terminals bears on a rate at which the terminal is moving.

5. The method of claim 1 wherein the communications associated with higher ones of the intermediate channel change indicia values are scheduled before lower ones of the intermediate channel change indicia values.

6. The method of claim 1 further comprising allocating resources to effect the communications based on error rates for previous communications for corresponding ones of the plurality of terminals.

7. The method of claim 1 wherein the communications are uplink communications and further comprising transmitting control information to one of the plurality of terminals wherein the control information includes the assigned time slot for transmitting data to a base station used to effect communications for the one of the plurality of terminals.

8. The method of claim 7 further comprising allocating communication resources for communications associated with the one of the plurality of terminals and providing indicia bearing on the communication resources allocated for communications in the control information.

9. The method of claim 8 wherein the communication resources bear on a transmit power the one of the plurality of terminals should use when transmitting data to effect communications.

10. The method of claim 1 wherein the communications are downlink communications and further comprising transmitting data to the plurality of terminals during the assigned time slots to effect communications.

11. The method of claim 10 further comprising allocating communication resources for communications associated with the one of the plurality of terminals.

12. The method of claim 11 wherein the resources bear on at least one of a group consisting of coding rates, modulation techniques, and data rates for transmitting data to the one of the plurality of terminals to effect communications.

13. A base station for scheduling communications in a wireless communication environment for a plurality of terminals comprising:
   a) wireless communication circuitry for communicating with a plurality of terminals; and
   b) a scheduler operatively associated with the wireless communication circuitry for:
      i) scheduling communications for the plurality of terminals to a scheduling period having a plurality of time slots;
      ii) determining channel change indicia associated with each of the plurality of terminals having communications scheduled during the scheduling period; and
      iii) scheduling the communications to an assigned time slot within the scheduling period based on the channel change indicia,
   wherein the communications for any one of the plurality of terminals occurs during the assigned time slot within the scheduling period, and
   wherein the channel change indicia can have low, intermediate, and high values and the communications associated with intermediate channel change indicia values are scheduled for time slots at a beginning of the scheduling period and ahead of communications associated with the low and high channel change indicia values, the values for channel change indicia proportional to a rate at which channel conditions are likely to change.

14. The base station of claim 13 wherein the channel change indicia bears on a rate at which channel conditions are likely to change.

15. The base station of claim 13 wherein the channel change indicia for at least one of the plurality of terminals bears on a rate at which actual channel conditions are changing and is derived from periodic measurements of the channel conditions.

16. The base station of claim 13 wherein the channel change indicia for at least one of the plurality of terminals bears on a rate at which the terminal is moving.

17. The base station of claim 13 wherein the communications associated with higher ones of the intermediate channel change indicia values are scheduled before lower ones of the intermediate channel change indicia values.

18. The base station of claim 13 wherein the scheduler is further adapted to allocate resources to effect the communications based on error rates for previous communications for corresponding ones of the plurality of terminals.

19. The base station of claim 13 wherein the communications are uplink communications and the scheduler is further adapted to cooperate with the wireless communication circuitry to transmit control information to one of the plurality of terminals wherein the control information includes the assigned time slot for transmitting data to the base station used to effect communications for the one of the plurality of terminals.

20. The base station of claim 19 wherein the scheduler is further adapted to allocate communication resources for communications associated with the one of the plurality of terminals and providing indicia bearing on the communication resources allocated for communications in the control information.

21. The base station of claim 20 wherein the resources bear on a transmit power the one of the plurality of terminals should use when transmitting data to effect communications.

22. The base station of claim 13 wherein the communications are downlink communications and the scheduler is further adapted to cooperate with the wireless communication circuitry to transmit data to the plurality of terminals during the assigned time slots to effect communications.

23. The base station of claim 22 wherein the scheduler is further adapted to allocate communication resources for communications associated with the one of the plurality of terminals.

24. The base station of claim 23 wherein the resources bear on at least one of a group consisting of coding rates, modulation techniques, and data rates for transmitting data to the one of the plurality of terminals to effect communications.

25. An apparatus for scheduling communications in a wireless communication environment for a plurality of terminals comprising:
   a) means for scheduling communications for a plurality of terminals to a scheduling period having a plurality of time slots;
   b) means for determining channel change indicia associated with each of the plurality of terminals having communications scheduled during the scheduling period; and
   c) means for scheduling the communications to an assigned time slot within the scheduling period based on the channel change indicia,
   wherein the communications for any one of the plurality of terminals occurs during the assigned time slot within the scheduling period, and
   wherein the channel change indicia can have low, intermediate, and high values and the communications associated with intermediate channel change indicia values are scheduled for time slots at a beginning of the scheduling period and ahead of communications associated with the low and high channel change indicia values, the values for channel change indicia proportional to a rate at which channel conditions are likely to change.

26. The apparatus of claim 25 wherein the channel change indicia bears on a rate at which channel conditions are likely to change.

27. The apparatus of claim 25 wherein the channel change indicia for at least one of the plurality of terminals bears on a rate at which actual channel conditions are changing and is derived from periodic measurements of the channel conditions.

28. The apparatus of claim 25 wherein the channel change indicia for at least one of the plurality of terminals bears on a rate at which the terminal is moving.

* * * * *